United States Patent [19]

Dewhirst

[11] Patent Number: 5,053,779

[45] Date of Patent: Oct. 1, 1991

[54] SIGNAL PROCESSING

[75] Inventor: Clifford Dewhirst, Herts, England

[73] Assignee: British Aerospace Public Limited Company, London, England

[21] Appl. No.: 359,796

[22] Filed: Jun. 1, 1989

[30] Foreign Application Priority Data

Jun. 1, 1988 [GB] United Kingdom ............... 8812906

[51] Int. Cl.$^5$ ............................................. G01S 13/24
[52] U.S. Cl. .................................... 342/195; 342/200
[58] Field of Search ................ 342/195, 129, 200, 112

[56] References Cited

U.S. PATENT DOCUMENTS

| | | | |
|---|---|---|---|
| H513 | 8/1988 | Dunne et al. ................... | 342/14 X |
| 3,801,979 | 4/1974 | Chisholm ......................... | 342/31 |
| 4,057,800 | 11/1977 | Ganz ............................... | 342/116 |
| 4,069,482 | 1/1978 | Parker et al. .................... | 342/162 |
| 4,148,026 | 4/1979 | Gendreu ........................... | 342/80 |
| 4,224,507 | 9/1980 | Gendreu ........................... | 342/80 X |
| 4,450,444 | 5/1984 | Wehner et al. ................... | 342/25 |
| 4,531,124 | 7/1985 | Lassallette et al. ............. | 342/195 |
| 4,583,177 | 4/1986 | Meyer ............................... | 364/451 |
| 4,586,047 | 4/1986 | Inacker et al. ................... | 342/372 |
| 4,616,229 | 10/1986 | Taylor, Jr. ........................ | 342/171 |
| 4,631,541 | 12/1986 | Prickett et al. .................. | 342/201 |
| 4,675,678 | 6/1987 | Klingenschmitt et al. ...... | 342/34 |
| 4,851,854 | 7/1989 | Drogin ............................. | 342/417 |

FOREIGN PATENT DOCUMENTS 0259143A 3/1987 European Pat. Off. .
8621200 9/1986 United Kingdom .

Primary Examiner—John B. Sotomayor
Attorney, Agent, or Firm—Cushman, Darby & Cushman

[57] ABSTRACT

A signal processing system for collecting and outputting samples of a signal; in which the system has a memory into which the samples are written such that when the memory is read the samples are read sequentially and always in the same frequency order, irrespective of the arrival sequence of the different frequencies.

12 Claims, 3 Drawing Sheets

FIG.3

| | RECEIVED SAMPLE No. | FREQ. | RAM CONTENT 1 | 2 | 3 | 4 | WRITE ADDRESS | READ F1 | READ F2 | READ F3 | O/P SEQUENCE |
|---|---|---|---|---|---|---|---|---|---|---|---|
| $t_0$ | $P_{11}$ | $f_1$ | $P_{10}$ | $P_{20}$ | $P_{30}$ | $\underline{P_{11}}$ | 4 | 1 | 2 | 3 | write(ω)<br>P10 (f1)<br>P20 (f2)<br>P30 (f3) |
| $t_1$ | $P_{21}$ | $f_2$ | $\underline{P_{21}}$ | $P_{20}$ | $P_{30}$ | $P_{11}$ | 1 | 4 | 2 | 3 | ω<br>P11 (f1)<br>P20 (f2)<br>P30 (f3) |
| $t_2$ | $P_{31}$ | $f_3$ | $P_{21}$ | $\underline{P_{31}}$ | $P_{30}$ | $P_{11}$ | 2 | 4 | 1 | 3 | ω<br>P11 (f1)<br>P21 (f2)<br>P31 (f3) |
| $t_3$ | $P_{12}$ | $f_1$ | $P_{21}$ | $P_{31}$ | $\underline{P_{12}}$ | $P_{11}$ | 3 | 4 | 1 | 2 | ω<br>P11 (f1)<br>P21 (f2)<br>P31 (f3) |
| $t_4$ | $P_{22}$ | $f_2$ | $P_{21}$ | $P_{31}$ | $P_{12}$ | $\underline{P_{22}}$ | 4 | 3 | 1 | 2 | ω<br>P12 (f1)<br>P21 (f2)<br>P31 (f3) |
| $t_5$ | $P_{32}$ | $f_3$ | $\underline{P_{32}}$ | $P_{31}$ | $P_{12}$ | $P_{22}$ | 1 | 3 | 4 | 2 | ω<br>P12 (f1)<br>P22 (f2)<br>P31 (f3) |
| $t_6$ | $P_{13}$ | $f_1$ | $P_{32}$ | $\underline{P_{13}}$ | $P_{12}$ | $P_{22}$ | 2 | 3 | 4 | 1 | ω<br>P12 (f1)<br>P22 (f2)<br>P32 (f3) |
| $t_7$ | $P_{23}$ | $f_2$ | $P_{32}$ | $P_{13}$ | $\underline{P_{23}}$ | $P_{22}$ | 3 | 2 | 4 | 1 | ω<br>P13 (f1)<br>P22 (f2)<br>P32 (f3) |
| $t_8$ | $P_{33}$ | $f_3$ | $P_{32}$ | $P_{13}$ | $P_{23}$ | $\underline{P_{33}}$ | 4 | 2 | 3 | 1 | ω<br>P13 (f1)<br>P23 (f2)<br>P32 (f3) |
| $t_9$ | $P_{14}$ | $f_1$ | $\underline{P_{14}}$ | $P_{13}$ | $P_{23}$ | $P_{33}$ | 1 | 2 | 3 | 4 | ω<br>P13 (f1)<br>P23 (f2)<br>P33 (f3) |
| $t_{10}$ | $P_{24}$ | $f_2$ | $P_{14}$ | $\underline{P_{24}}$ | $P_{23}$ | $P_{33}$ | 2 | 1 | 3 | 4 | ω<br>P14 (f1)<br>P23 (f2)<br>P33 (f3) |
| $t_{11}$ | $P_{34}$ | $f_3$ | $P_{14}$ | $P_{24}$ | $\underline{P_{34}}$ | $P_{33}$ | 3 | 1 | 2 | 4 | ω<br>P14 (f1)<br>P24 (f2)<br>P33 (f3) |
| $t_{12}$ | $P_{15}$ | $f_1$ | $P_{14}$ | $P_{24}$ | $P_{34}$ | $\underline{P_{15}}$ | 4 | 1 | 2 | 3 | ω<br>P14 (f1)<br>P24 (f2)<br>P34 (f3) |
| $t_{13}$ | | | | | | | | | | | |

SIGNAL PROCESSING

FIELD OF THE INVENTION

This invention relates to the processing of signals from a frequency agile radar receiver, more particularly but not exclusively processing having the object of detecting targets within a surveyed scene. The invention also relates to a signal processor system which is adapted for carrying out the process of spectral decomposition of a series of variables, this process forming the subject of our patent application EP 0259143A.

The processing of radar signals may include taking a group of successive signal samples and testing them as a group for some property. When a new sample arrives, it and all but the oldest of the previously tested group are tested, and so on. Successive time samples of a frequency agile radar return are associated with respective different frequencies and, in order to make a test, the processor will require the samples in a frequency ordered manner. Thus, one object of the invention is to provide a means for calling up stored frequency agile radar signal samples in a frequency ordered manner without the complex software-based sorting or indexed addressing modes which this normally involves.

SUMMARY OF THE INVENTION

According to one aspect of the invention, there is provided a signal processing system for collecting and outputting samples of a frequency agile radar receiver signal, the system comprising a memory having a number of sample storage locations one greater than the number of samples to be operated upon at any one time, instruction signal supply means for controlling the writing of new samples into said memory and the reading of samples from the memory, store means for storing a table relating frequency relative address instructions to physical location addresses of said memory and counter means connected to the address input of said store means, said instruction signal supply means being also connected to said address input of the store means and the output of the store means being connected to the address input of the memory.

BRIEF DESCRIPTION OF THE DRAWINGS

Further aspects of the invention will appear from the following description.

For a better understanding of the invention, reference will be made, by way of example, to the accompanying drawings, in which:

FIG. 3 is a table for illustrating the operation of the FIG. 2 system, and

DESCRIPTION OF THE PREFERRED EMBODIMENT

Figure 1:
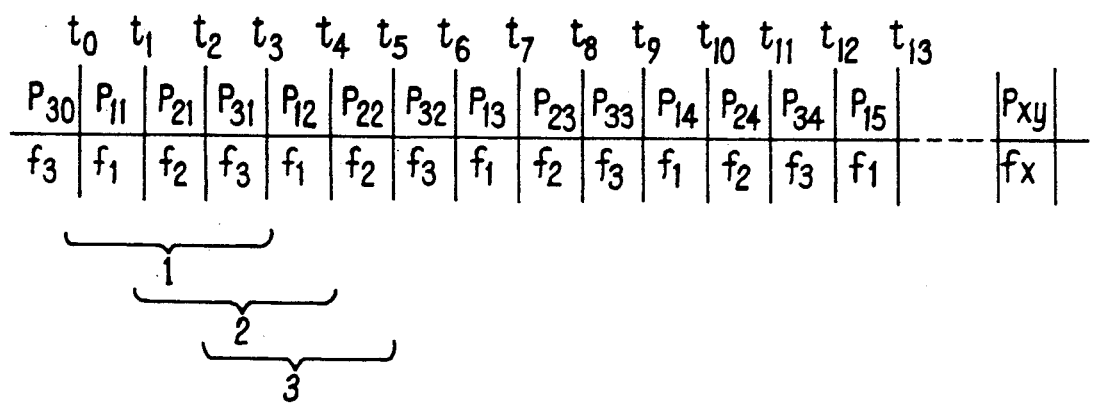
FIG. 1 is a diagram showing a series of successive signal samples from a radar receiver.

To explain the operation of the invention, say that a frequency agile radar receiver produces a sequence of return signal samples $P_{xy}$ as shown in FIG. 1, each sample being taken whilst the radar transmission/reception frequency is at one of three values $f_1$, $f_2$ and $f_3$. The samples are frequency ordered, i.e. starting at time $t_0$, sample $p_{11}$ at frequency $f_1$ is received, then sample $p_{21}$ at frequency $f_2$ is received, then sample $p_{31}$ at frequency $f_3$, then sample $p_{12}$ at frequency $f_1$ (the second sample at this frequency) and so on. Meanwhile, in a computer, each new sample along with the two preceding samples are to be tested as a combination to see if that combination represents a target. Thus, if the first test is to be made using the samples $p_{11}$, $p_{21}$ and $p_{31}$, the second test is made on samples $p_{21}$ $p_{31}$ and $p_{12}$, the third on samples $p_{31}$, $p_{12}$ and $p_{22}$ and so on. To permit such testing the samples are stored. Meanwhile, for each test, the computer will require to know to which of the frequencies $f_1$, $f_2$ and $f_3$ the samples relate—for example, the computer may need to read the three samples of the tested combination in frequency order which only occasionally corresponds to time sample order. Thus, for the first test noted above the time sample order does correspond to frequency order and the samples can be read in the given sequence $p_{11}$, $p_{21}$, $p_{31}$. For the next test however, the newest of the three samples $p_{12}$ is read first, then the ante-penultimate and then the penultimate of the three samples. For the third test, the penultimate one of the three samples is to be read first, then the newest and then the ante-penultimate.

As mentioned earlier, the above requirements could be achieved by a process of software sorting the samples whilst they are held in store or by making use of indexed addressing of the store. Each of these processes involve a considerable time overhead.

Figure 2:
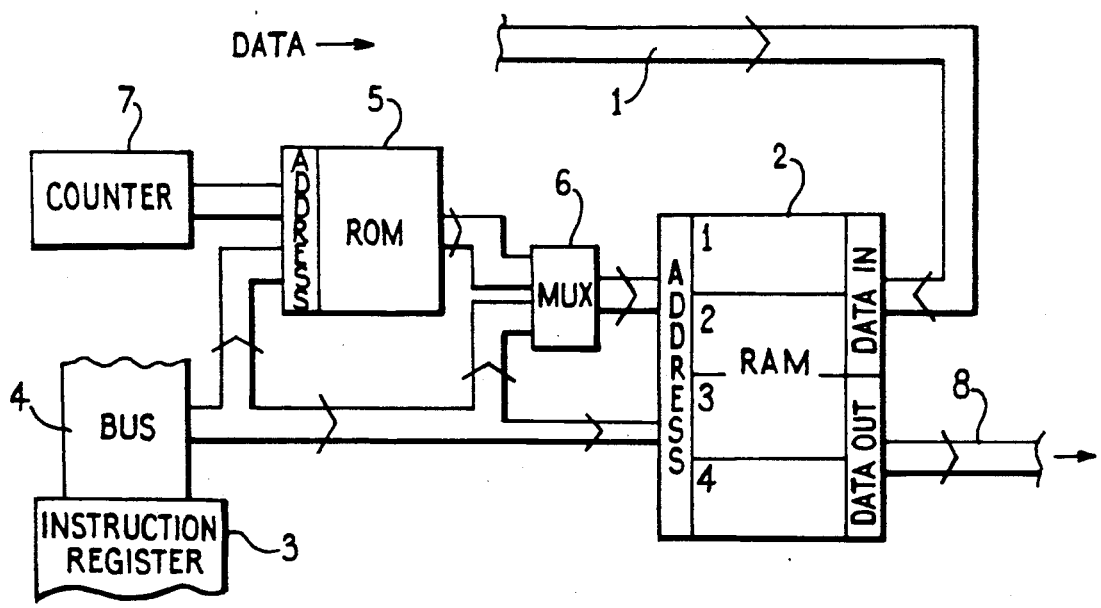
FIG. 2 is a simplified diagram of a system for processing the FIG. 1 samples.

In FIG. 2, a series of samples from a frequency agile radar receiver (not shown) is received along data bus 1 and written into a random access memory 2 having a capacity to hold $p+1$ samples, for each frequency agile radar signal received, where p is the number of samples taken for each test. Thus, assuming that the testing is to be as described above with reference to FIG. 1 (this assumption will be made for the purpose of the following description), the memory 2 will have four locations as shown.

A device 3 makes available on bus 4 a sequence of multiple-bit instructions of which the address parts are fed to each of the address inputs of a read only memory 5 and to one input of a multiplexer 6. By way of example, device 3 could be a read-only memory driven by a program counter (not shown) or an instruction register forming part of a central processor unit. Also applied to the address input of memory 5 is the output of a counter 7. The data output of memory 5 is connected to the other input of multiplexer 6, the output of this multiplexer being applied to the address input of memory 2. Bus 4 includes some control lines which are applied to the multiplexer 6 to control whether it passes the output of memory 5 or the address part of the instructions on bus 4 onto the memory 2. Control lines of bus 4 are also connected direct to memory 2 to pass read/write control signals thereto. Data is read out of memory 2 onto output bus 8.

In functional terms, for the process of writing the samples arriving along bus 1 into memory 2, the memory is operated as a circular buffer memory—namely, as shown in the table of FIG. 3, the receiver samples are written to respective locations of the memory one after another in repetitive sequence so that sample $p_{11}$ is written to location 4, $p_{21}$ to location 1, $p_{31}$ to location 2, $p_{12}$ to location 3, $p_{22}$ to location 4 (overwriting sample $p_{11}$) and so on. Meanwhile, read out from the memory is from the other three locations. Thus, while sample $p_{11}$ is being received ($t_0$–$t_1$), sample $p_{10}$ is read out from location 1, then $p_{20}$ is read from location 2 and then $p_{30}$ is read from location 3. During time $t_1-t_2$, while sample $p_{21}$ is being received, sample $p_{11}$ is read out from location 4, then $p_{20}$ and $p_{30}$ are read one after another from locations 2 and 3 as before. The sequence continues as shown in FIG. 3 until time $t_{12}$ when it starts to repeat itself.

The writing to and reading from memory 2 are commanded by the device 3 but, at least while the multiplexer 6 is operative to connect the output of memory 5 through to memory 2, the instructions from device 3 contain 'frequency-relative' addresses, i.e. each of these instructions simply calls for a write of the newly arrived sample into memory 2 or reading from that memory of the $f_1$, $f_2$ or $f_3$ sample as the case may be. These instructions, along with the output from counter 7, address the memory 5 which contains a look-up table of the physical addresses at which the new sample is to be written and at which the $f_1$, $f_2$ and $f_3$ sample are to be read for each sample time period. Thus, the content of the look-up table corresponds to that of the 7th to 10th columns of FIG. 3. Meanwhile, counter 7 is incremented by one for each sample time period and counts repetitively between limits separated by one cycle of the read address sequence shown in FIG. 3, e.g. it may count repetitively from 0 to 11. Counter 7 addresses one dimension of the look-up table in memory 5, i.e. the rows of the table in FIG. 3, while the signals from device 3 address the other dimension, i.e. the columns of FIG. 3. Thus, during time $t_0-t_1$, a write new sample instruction from device 3 causes memory 5 to address location 4 of memory 2 while read $f_1$, $f_2$ and $f_3$ instructions cause address signals 1, 2 and 3 respectively to be outputted from memory 5 to memory 2. During time $t_1-t_2$ on the other hand, the write address from memory 5 is location 1 of memory 2 while the read $f_1$, $f_2$ and $f_3$ addresses are locations 4, 2 and 3 respectively.

As will be appreciated, the processing device of FIG. 2 could and normally would form part of a computer which carries out other functions as well as just the reception, ordering and read-out of the samples. Such a computer will comprise various devices (not shown) for processing the sample before and/or after the ordering and read-out from memory 2 and these devices will be connected to all or respective parts of the bus 4.

It will be appreciated also that it is not essential that the write and read sequence given in the right-hand column of FIG. 3 be followed. In general terms, sometime during each sample period, the sample then arriving is written into the memory 2 while the $f_1$, $f_2$ and $f_3$ samples are read. However, such reading could be done more than once and not necessarily in the same order every time. It is still the case that the device 3 only has to denote the frequency of the sample it wants to read—the physical addressing of memory 2 being done by memory 5 and being entirely transparent to device 3.

Direct addressing of the memory 2 from device 3 may sometimes be desirable, particularly if the illustrated device forms part of a computer system which also carries out further processing of the samples in which case, of course, the memory 2 may comprise only a part of a much larger system memory. The multiplexer 6 allows such direct addressing—on command from the device 3, it is simply switched over as and when required so as to connect bus 4 direct to memory 2 and to disconnect therefrom the output of memory 5.

Finally, it will be appreciated that the described test group each comprising three samples of a single discriminant are given only by way of example. There may be more samples in each group and/or there may be more than one discriminant, e.g., a group might contain several samples of each of the amplitude, phase and polarisation of the radar return.

Figure 4:
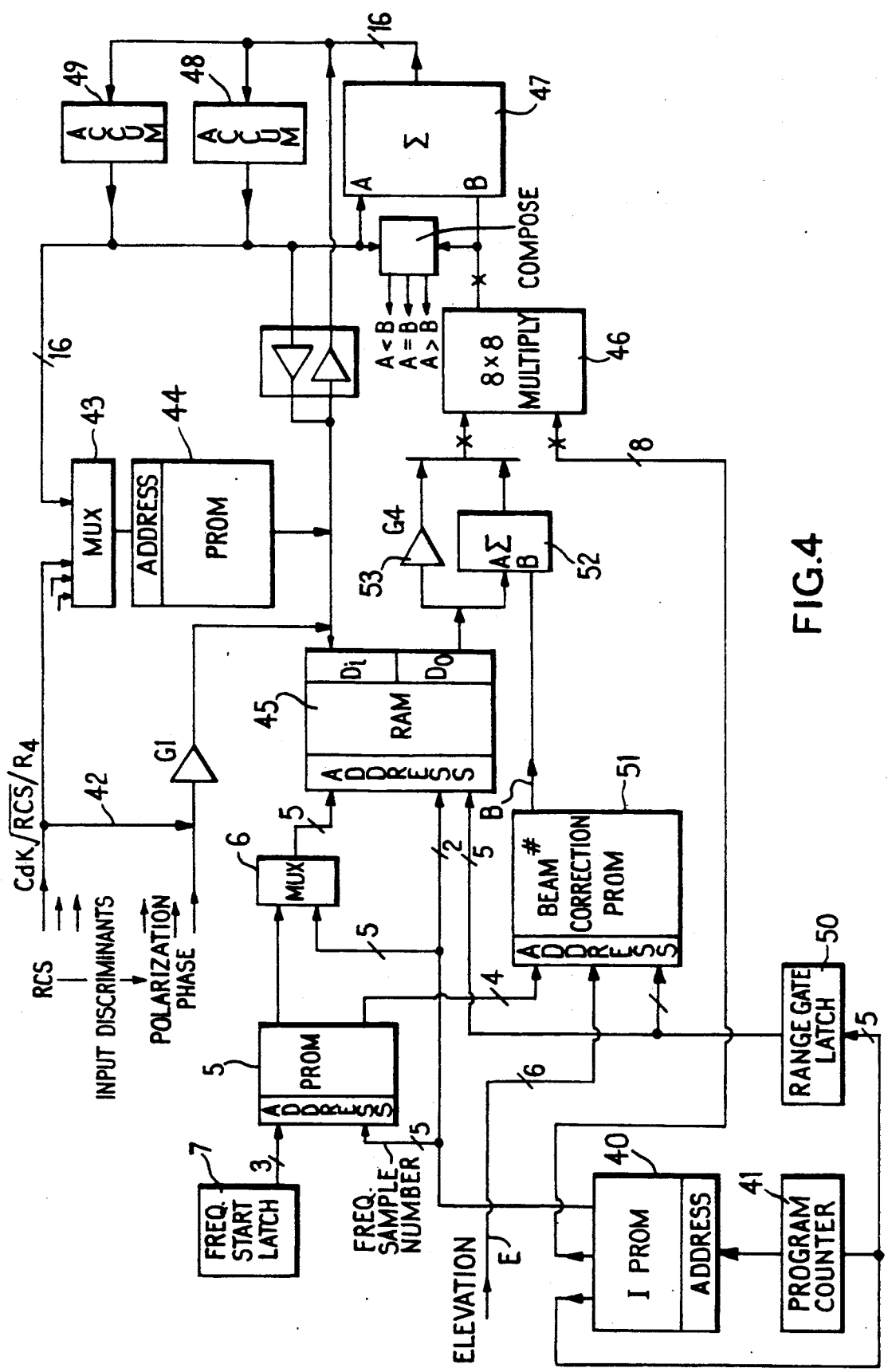
FIG. 4 is a simplified diagram of a spectral decomposition processor.

An example of an overall computer processor system is shown in FIG. 4, the function of this system being to carry out 'spectral decomposition', i.e. taking a group of variables and combining them with pre-calculated spectral decomposition vectors (SD vectors) of the group so as to form a new set of variables as disclosed in our patent application no. 8621200. The new set may contain fewer variables than the first and yet comprise as much as is required of the information in the first. This can achieve better efficiency for a multi-dimensional target look-up table system. Say that a group comprising three successive samples of each of three discriminants, namely the phase p, polarisation factor k and amplitude r (amplitude corresponds to a parameter called the radar cross-section or RCS) of a radar return, is to be decomposed to form a group of five variables $d_1$ to $d_5$, which can be used to address a five-dimensional look-up table to see whether or not the return incorporates the 'signature' of a possible target. Then the processing to be performed is:

$d_1 = e_1k_1 + e_2p_1 + e_3r_1 + e_4k_2 + e_5p_2 + e_6r_2 + e_7k_3 + e_8p_3 + e_9r_3$ $d_2 = f_1k_1 + f_2p_1 + f_3r_1 + f_4k_2 + f_5p_2 + f_6r_2 + f_7k_3 + f_8p_3 + f_9r_3$ $d_3 = g_1k_1 + g_2p_1 + g_3r_1 + g_4k_2 + g_5p_2 + g_6r_2 + g_7k_3 + g_8p_3 + g_9r_3$ $d_4 = h_1k_1 + h_2p_1 + h_3r_1 + h_4k_2 + h_5p_2 + h_6r_2 + h_7k_3 + h_8p_3 + h_9r_3$ $d_5 = j_1k_1 + j_2p_1 + j_3r_1 + j_4k_2 + j_5p_2 + j_6r_2 + j_7k_3 + j_8p_3 + j_9r_3$

Where constants $e_q$ to $j_q$ are the qth elements of SD vectors 1 to 5 respectively of the original group. As discussed in patent application no. 8621200, the constants can be pre-calculated on the basis of experimental data. Thus, each of the variables $d_1$ to $d_5$ is formed by summing the original nine variables after they have been multiplied by respective constants, the constants being different for different ones of the output variables $d_1$ to $d_5$. In addition to these calculations, the processor carries out certain pre-processing functions on the received samples as will be seen.

The particular operation that the system is carrying out at any particular time is determined by the instruction then being read out of programmable read-only memory 40, which memory is addressed by program counter 41. Each instruction in memory 40 comprises an instruction code part together with an operand eg one of the multiplier constants $e_g$ to $j_q$.

The samples are received from the radar receiver along bus 42 and amplitude (RCS) samples are passed via multiplexer 43 to the address inputs of programmable read only memory 44. Memory 44 contains three look-up tables one of which is operative to convert each amplitude sample to its logarithm value. The logarithm values are loaded into random access memory 45 along with the polarisation factor and phase samples which are received from the bus direct.

As noted, the instructions read out from memory 40 control the operability of the system and this includes say the operation of the multiplexer 43. However, to simplify FIG. 4, while the data flow paths are shown, only some of the control paths are—for example, in practice, multiplexer 43 would be connected to receive at least part of the instructions from memory 40 but the connections for this are not shown.

The successive samples of each of the three discriminants p, k and r are written into successive locations in respective ones of three circular buffers, ie one for each discriminant, funtionally defined within memory 45. The writing and reading out of the samples of each discriminant is carried out as described with reference to FIGS. 1 to 3. Thus the system includes a counter 7, read-only memory 5 and multiplexer 6 like the correspondingly numbered items of FIG. 2 except that, of course, the look-up table in memory 5 is extended to allow for the three discriminants now being handled.

The samples are read out of memory 45 in succession to a multiplier 46 which also receives from the instruction memory 40 the appropriate one of the constants $e_q$ to $j_q$ by which the sample is to be multiplied. The constants are of course pre-entered into memory 40 as the operand parts of appropriate instructions. Each product formed by multiplier 46 is passed to one input of an adder 47 of which the other input is supplied with the content of an accumulator register 48, the sum so formed being then used to update the content of register 48. The system can be arranged so that the multiplication and accumulation operations are pipelined, ie so that although a complete operation takes two clock cycles, the multiplication can be occurring in relation to one sample while the next preceding product is being accumulated and the accumulator register 48 hence receives a new sum every clock cycle.

When the accumulator 48 holds the complete variable ie when it has summed all the products making up that one of the variables $d_1$ to $d_5$ which is being formed at the time, the variable is fed via the multiplexer 43 to the memory 44 where it addresses a second look up table therein. The reason for this is that the summed variable may have a value anywhere within an overall range and hence has to be 'quantized' to form a discrete address for the relevant dimension of the target look-up table. The generation of the discrete address is done by the second look-up table in memory 44. The address read from memory 44 is loaded into a second accumulator register 48.

The multi-dimensional target look-up table is also held in memory 44. It contains pre-entered, experimentally determined values indicating the probability that respective combination of values of the variables $d_1$ to $d_5$ represent a target. When all the variables $d_1$ to $d_5$ have been calculated and loaded into register 49, the contents of that register are passed via multiplexer 43 to the memory 44 and there addresses the target look-up table. The resulting probability value is loaded into memory 45 along with previously formed such values whereupon the computer system can look at the values together to identify target indicative patterns (this process being called 'plot extraction'). For this process, the instructions in memory 40 will address the memory directly and this can be done by appropriate operation of the multiplexer 6 as described earlier. Instead of containing probability values, the target look-up table in memory 44 could contain simple 'target' signals. Particularly in this case (since it is likely then that the process of plot extraction would be less helpful) but also in the case where the table contains probability values, the target look-up table output could be taken off from the output of memory 44 direct to some further apparatus (not shown) rather than being written into memory 45.

As with the FIG. 2 apparatus, the nature of the discriminants processed by the FIG. 4 system and the number of samples in each test group are a matter of design choice. Thus, the system may be required to process samples received from a series of range channels of the radar receiver in which case further processing to achieve what is called 'beam correction' may be required, ie., to allow for the varying antenna gain each side of the radar beam axis. For this, the parts 50 to 53 may be added. These include a range gate latch 50 for holding the number of the range channel being processed, a memory 51, a summing device 52 and buffer 53. Memory 51 is addressed by latch 50, a beam elevation signal E from the radar, and a frequency/time sample indicative output from memory 5 so as to output an appropriate beam correction factor B which, if the sample being processed is an amplitude sample, is added to the sample before it enters the multiplier 46. Samples of other discriminants are passed to multiplier 46 via buffer 53.

I claim:

1. A signal processing system for collecting and outputting samples of a frequency agile radar receiver signal, the system comprising:

memory means for storing a number of samples one greater than a number of samples to be operated upon at any one time, instruction signal supply means for producing frequency relative addresses to control writing of new samples into said memory means and reading of samples from the memory means such that said samples to be operated on are read out from said memory means and a newest sample is input to said memory means, store means for storing a table relating frequency relative addresses and different cycles to physical location addresses of said memory means, and counter means, connected to an address input of said store means for counting cycles of operation, wherein said instruction signal supply means being also connected to said address input of the store means, and an output of the store means being connected to the address input of the memory means to provide addresses thereto.

2. A system according to claim 1, further comprising a multiplexer forming a connection from the output of the store means to the address input of the memory means, said multiplexer being connected to said instruction signal supply means for interrupting said connection from the output of the store means to the address input of the memory and for supplying signals from said instruction signal means to the memory.

3. A system as in claim 1, wherein said instruction signal supply means supplies a signal to said store means indicative of a location in said memory means at which a current information is being stored, and said store means determines where said samples to be operated on are stored in said memory means based on said signal and an output of said counter means.

4. A system as in claim 1, wherein said memory means includes a circular buffer, in which current data is stored at a next location after the location previously used, and overwriting any data at said next location.

5. A system as in claim 3, wherein said memory means includes a circular buffer, in which current data is stored at a next location after the location previously used, and overwriting any data at said next location.

6. A system as in claim 5, further comprising means for operating on said samples which are not currently being stored.

7. A system as in claim 3, wherein said memory means includes means, responsive to said store means, for outputting said samples which are not currently being stored, in frequency order.

8. A system as in claim 5, wherein said memory means includes means, responsive to said store means, for outputting said samples which are not currently being stored, in frequency order.

9. A system according to claim 1, further comprising means for converting the samples into respective logarithm values thereof prior to writing said samples to the memory means.

10. A signal processing system for collecting and outputting samples of a plurality of different discriminants of a frequency agile radar receiver signal, the system comprising:
  memory means for storing, for each said discriminant, a number of samples one greater than a number of samples of that discriminant which are to be operated on at any one time;
  instruction signal supply means for producing frequency relative addresses to control writing of new samples into said memory means and reading of samples from said memory means such that said samples to be operated on are read out from said memory means and newest samples of each discriminant are input to said memory means;
  store means for storing a table relating frequency relative addresses and different cycles to physical location addresses of said memory means; and
  counter means, connected to an address input of said store means for counting cycles of operation,
  wherein said instruction signal supply means is also connected to said address input of the store means, and an output of the store means is connected to the address input of said memory means to provide addresses thereto.

11. A signal processing system according to claim 10, further comprising:
  multiplier means connected to said memory means for receiving a sample therefrom and for multiplying said sample by a predetermined constant to form a product value representative of the product of said sample and said predetermined constant;
  further memory means storing a plurality of values; and
  adder means connected to said multiplier means and said further memory means for adding said product values to a selected one of said plurality of values previously stored in said further memory means.

12. A signal processing system according to claim 11, further comprising target detection means for comparing said plurality of values stored in said further memory means with predetermined values for determining the probability of said plurality of values being indicative of a target.

* * * * *